United States Patent [19]

Hill

[11] 4,187,706
[45] Feb. 12, 1980

[54] ANTITHEFT GUARD FOR IGNITION SWITCH

[76] Inventor: John C. Hill, 11604 Thornwood, Cleveland, Ohio 44108

[21] Appl. No.: 863,084

[22] Filed: Dec. 22, 1977

[51] Int. Cl.$^2$ .............................................. E05B 17/14
[52] U.S. Cl. ..................................................... 70/428
[58] Field of Search ................. 70/211, 212, 237, 247, 70/423, 424, 428, 427

[56] References Cited

U.S. PATENT DOCUMENTS

| | | | |
|---|---|---|---|
| 3,665,738 | 5/1972 | Pescoma | 70/211 |
| 3,811,303 | 5/1974 | Robertson | 70/237 |

*Primary Examiner*—Robert L. Wolfe
*Attorney, Agent, or Firm*—Watts, Hoffmann, Fisher & Heinke

[57] ABSTRACT

An antitheft guard for an ignition switch comprises a housing adapted to overlie the ignition switch, the housing comprising a cylindrical cup-like section closed at one end and shaped at the periphery of the open end to conform generally to the contour of the steering column. The housing is held in place by hinged arcuate sections adapted to encircle the steering column. The arcuate sections and the periphery of the cup-like section may be padded to prevent marring of the steering column. A portion of the housing and one of the arcuate sections cooperate to permit a padlock to retain the assembly securely in place on the steering column.

1 Claim, 4 Drawing Figures

ANTITHEFT GUARD FOR IGNITION SWITCH

BACKGROUND OF THE INVENTION

1. Field of the Invention

The invention relates to antitheft guards for ignition switches and, more particularly, to such a guard adapted to encircle the steering column and overlie the ignition switch.

2. Description of the Prior Art

For many years now it has been conventional in a highway vehicle such as an automobile or truck to position the ignition switch on the steering column intermediate the steering wheel and the dashboard. Typically, the ignition switch is disposed on the steering column facing toward the right-hand side of the vehicle where it is accessible readily to the operator's right hand. Various controls such as a turn signal lever, headlight dimming lever and so forth may be disposed on the steering column, spaced generally diametrically from the ignition switch and facing toward the left-hand side of the vehicle where the lever may be accessible to the operator's left hand.

In recent years, the ignition switch has served several functions: (1) a key-operated switch by which the electrical system of the vehicle may be energized so that the engine and other vehicle components may be operated; (2) a steering wheel lock so that once the key has been removed from the ignition switch the steering wheel cannot be turned; and (3) a transmission lock so that once the key has been removed from the ignition switch the transmission cannot be shifted from a wheel-locking gear. It is common knowledge that the ignition switch can be bypassed and, hence, the vehicle stolen, if access may be had to portions of the electrical circuitry usually disposed under the vehicle's hood and near the engine. That is, the first-mentioned protective feature of the ignition switch can be defeated without the use of a key, provided appropriate wires in the electrical circuitry can be connected around the switch. Clearly the value of the ignition switch as a theft-deterrent device is diminished because of this shortcoming.

The other functions of the ignition switch (the steering wheel lock and transmission lock) pose a more substantial deterrent to potential thieves. This is because even if the engine can be started without the use of a key, the vehicle still cannot be driven if the steering wheel cannot be turned and the transmission cannot be shifted out of a wheel-locking gear. Unfortunately, it has been discovered that the locking features of the ignition switch can be defeated with little trouble. One approach is to insert the blade end of a slender, strong screwdriver into the key slot and drive the screwdriver blade through the lock by impacting the screwdriver with a large hammer or other object. By this technique, either the pins in the lock are sheared or the lock simply fails structurally. In either case, the locking features of the ignition switch are overcome and the vehicle may be driven.

Others have attempted to overcome this obvious defect of key-operated ignition switches by providing a guard adapted to prevent unauthorized access to the ignition switch. In a typical prior art ignition switch guard, a specially formed housing made of heavy gauge sheet material overlies the ignition switch and conforms closely to the contour of the steering column where the housing engages the steering column. Hinged arcuate sections, a U-bolt, or a chain may be connected to the housing and extend around the steering column so that through the use of an appropriate locking device, the housing may be secured rigidly to the steering column.

Such guards theoretically are effective deterrents to potential thieves. In practice, prior guards suffer certain drawbacks which limit their effectiveness or application. One drawback of prior guards is their excessive complexity which tends to increase manufacturing expenses to the extent that consumer acceptance is unlikely. It is apparent that an ignition switch guard, however meritorious, is completely ineffective if it so expensive that it is never purchased and used. In a similar vein, certain prior guards are quite bulky and unattractive. Again, consumer acceptance is unlikely because of the obvious difficulty in maneuvering the guard into and out of position, as well as the detrimental effect on the vehicle's appearance.

Other drawbacks of certain prior ignition switch guards deal with the strength characteristics of the guards. In one case the protective guard only partially overlies the ignition switch so that access to the ignition switch may be had rather easily by deforming the ignition guard as by prying with a crowbar. Other types of ignition guards may completely overlie the ignition lock, but may have hinges or locking devices of inadequate strength. The result of any of these shortcomings is that the guard can be deformed mechanically to the point where unauthorized access to the ignition switch may be had rather readily.

SUMMARY OF THE INVENTION

The present invention provides a new and improved antitheft guard for vehicle ignition switches which overcomes the objections mentioned above and which is exceedingly simple, strong, and compact. Because of its simplicity, the ignition switch guard according to the invention can be manufactured inexpensively compared with prior ignition switch guards. Also, because of its novel configuration, the antitheft guard according to the invention is considerably stronger than prior guards and, accordingly, provides a substantial deterrent to unauthorized tampering with the ignition switch. Because of its compactness, the guard can be applied to and removed from the steering column with a minimum of difficulty, thus facilitating its use; moveover, the appearance of the vehicle is not adversely affected when the guard is in use.

The invention is characterized by a housing adapted to overlie the ignition switch. The housing comprises a cylindrical, cup-like section closed at one end and shaped at the periphery of the open end to conform generally to the contour of the steering column. The cup-like section may be formed from a short section of pipe and the housing closure may be made by a disc-like member welded in place. This construction is very simple and inexpensive and yet provides greater strength than prior art specially-configured sheet metal housings.

A pair of arcuate members encircle the steering column and are fixed to the housing to retain the housing in place. A first tab extends outwardly of the housing and generally orthogonally to the housing. One end of the first arcuate member is hinged to the tab. The other end of the first arcuate member includes an outwardly extending tab to which the other end of the second arcuate member is hinged. The housing includes a second outwardly extending tab spaced generally diametrically from the first tab and adapted to be engaged by the other end of the second arcuate member.

By this construction, the housing can be disposed to overlie the ignition switch and the arcuate members can be wrapped about the steering column to encircle the steering column and engage it tightly. A locking device such as a conventional padlock can be used to secure the second arcuate member to the second tab extending outwardly of the housing and thus retain the entire assembly in place on the steering column.

To prevent the steering column from becoming marred a protective substance such as foam padding may be applied to the inner surfaces of the housing and the arcuate members at those points where the steering column is engaged. Alternatively, a protective coating of tinted plastic may be painted or shrink-fitted to the components. The latter approach enhances the appearance of the guard and thus promotes its consumer acceptance.

The arcuate members may be provided in various configurations to enable the guard to be used with differently-sized steering columns or with steering columns having various projecting portions. If desired, a spring may be connected intermediate the second arcuate section and the housing to urge the arcuate sections and the housing constantly into engagement with the steering column. This prevents the guard from vibrating objectionably on the steering column and it also permits ready acces to the ignition lock without the guard falling from the steering column. Also, the locking device can be disengaged and the guard moved to a different position on the steering column without concern that the guard will fall to the floor or otherwise become cumbersome. This increases the convenience of the device and encourages frequent use of the device.

Additional advantageous features of the invention will become apparent from the following detailed description of a preferred embodiment of the invention, made with reference to the accompanying drawings which form a part of the specification.

DESCRIPTION OF THE PREFERRED EMBODIMENT

Figure 1:
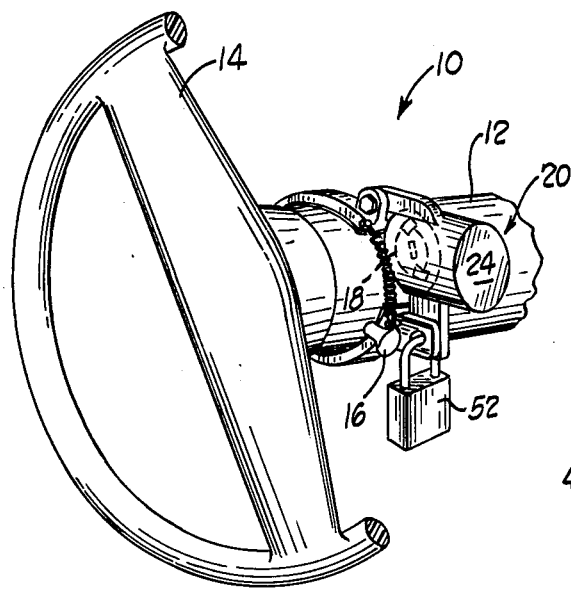
FIG. 1 is a perspective view of an ignition switch guard according to the invention as it might be applied to the steering column of a vehicle.

An ignition switch antitheft guard 10 according to the invention is shown in FIG. 1. The guard is disposed about a steering column 12 cylindrical in cross-section. A steering wheel 14 is mounted at one end of the column closest to the operator. A push-pull emergency flasher switch 16 extends outwardly of the steering column on the right-hand side of the column and a turn signal lever (not shown) extends outwardly on the steering column on the left-hand side of the column. An ignition switch 18 is carried by the steering column 12 and faces generally toward the right-hand side of the vehicle.

Figure 2:
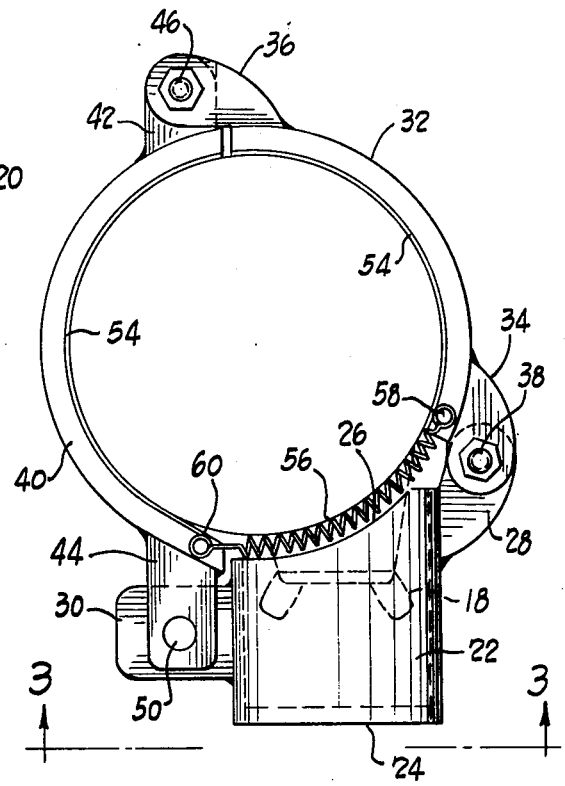
FIG. 2 is a side-elevational view of an ignition switch guard according to the invention.

The antitheft guard 10 includes a housing 20 comprised of a cylindrical, cup-like section 22. The cylindrical section 22 is closed at one end by a disc 24 secured in place at its periphery as by welding. The cylindrical section 22 is shaped at its open end 26 to conform generally to the contour of the steering column 12. In FIG. 2, the end 26 is contoured to conform closely to the contour of the steering column 12. If desired, the end 26 could be formed to lie in a plane positioned approximately tangent to the steering column 12 at that point where the cylindrical section 22 engages the steering column 12. The latter configuration is effective and inexpensive.

The cylindrical section 22 may be formed from commercially available steel pipe having excellent strength characteristics. The disc 24 may be formed of similar material to assure maximum strength of the guard 10.

A first tab 28 projects outwardly of the cylindrical section 22 generally orthogonally to the surface of the cylindrical section 22. A second tab 30 projects outwardly of the section 22 and generally orthogonally to the surface of the section 22. The tab 30 is spaced approximately diametrically from the tab 28. Both of the tabs 28, 30 are secured rigidly to the section 22 as by welding.

A first arcuate section 32 having a first end 34 and a second end 36 partially encircles the steering column 12. The ends 34, 36 comprise tabs extending longitudinally of the arcuate member 32. The tab 34 is secured to the tab 28 by a fastener 38. In the example shown, the fastener 38 comprises a bolt having a nut threadedly secured at its end, the nut being welded in place to prevent removal. By this construction the first arcuate section 32 is hinged to the cylindrical section 22 in a simple, yet strong, fashion.

The guard 10 also comprises a second arcuate member 40 having a first end 42 and a second end 44. The end portions 42, 44 comprise tabs extending longitudinally of the second arcuate member 40. The arcuate members 32, 40 are secured at their second and first ends, respectively, by a fastener 46 joining the tabs 36, 42. The fastener 46 may be identical to the fastener 38 and may be secured to the tabs 36, 42 in a similar manner to permit free movement of the arcuate sections 32, 40 without permitting their separation. The tabs 30, 44 include openings 48, 50, respectively, which may be aligned to permit a locking device to secure the tabs together. A conventional padlock 52 may be used for this purpose.

The arcuate sections 32, 40 include a coating of protective material 54 such as a thin layer of foam rubber on their inner surfaces. When the arcuate sections 32, 40 are wrapped about the steering column 12, the protective material 54 not only will prevent the steering column from becoming marred, but also will tend to prevent objectionable noise resulting from vibration. If desired, the end 26 of the cylindrical section 22 may be provided with a similar coating. Other coatings may be used, if desired, including commercially available tinted plastic films which may be painted or shrink-fitted to the components.

Figure 3:
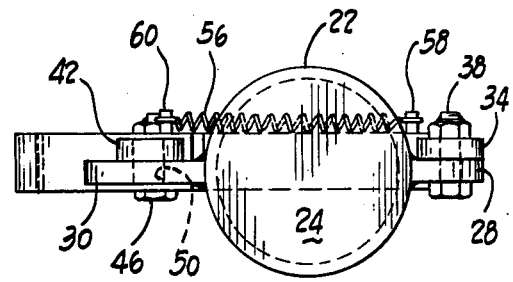
FIG. 3 is a view taken along line 3—3 of FIG. 2.

Referring to FIG. 3, it is seen that the tabs comprising the ends of the arcuate sections 32, 40 are offset from the longitudinal centerline of the arcuate sections so that the arcuate sections are maintained in alignment. This permits the arcuate sections to be hinged without binding and yet avoids stress concentrations which could adversely affect the strength of the guard.

A spring 56 optionally may be employed with the guard 10 to mimimize vibration of the components and to permit the guard 10 to be retained on the steering column 12 even when the lock 52 is not used to secure the guard. The spring 56 is affixed at one end to a pin 58 disposed near the first end of the arcuate section 32 and is fixed at its other end to a pin 60 affixed to the second end of the other arcuate section 40. The spring 56 accordingly biases the arcuate members firmly into engagement with the steering column 12. The spring 56 facilitates use of the guard because the guard can be moved along the length of the steering column when it is not in use. Without the use of such a device, the operator would have to place the guard on the dashboard, floor, or other out-of-the-way place to avoid interference while driving. In turn, the operator might be tempted not to retrieve the guard and employ it when a stop is made.

Figure 4:
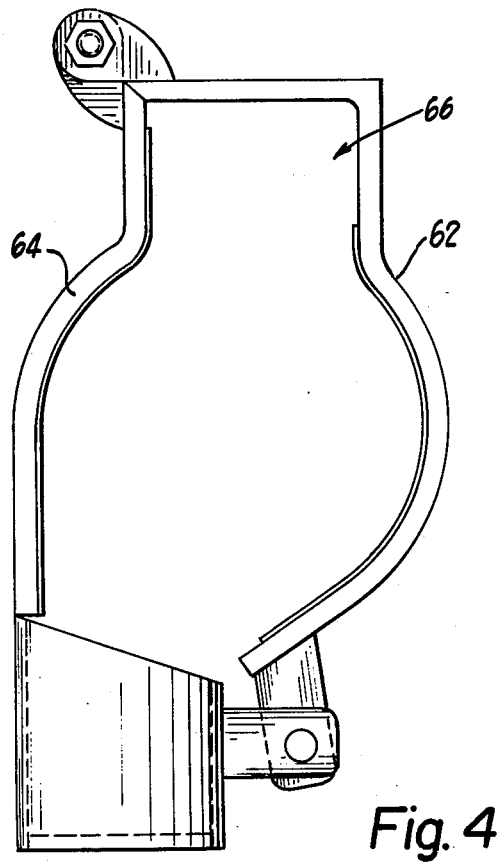
FIG. 4 is a side-elevational view of an alternative embodiment of an ignition switch guard according to the invention.

An alternative embodiment of the invention is shown in FIG. 4. The alternative embodiment is similar in many respects to the embodiment already described and like reference numerals are carried over where appropriate. The principal difference lies in the shape of arcuate sections 62, 64. The arcuate sections form a rectangular enclosure 66 when they are in position to engage the steering column. The rectangular enclosure 66 is provided only to accommodate certain vehicles having projections extending outwardly of the steering column and it performs no other structural function. Clearly the arcuate members can be shaped however desired to accommodate steering columns having various projections or even steering columns out-of-round.

The open end of the housing, instead of conforming identically to the contour of the steering column, lies in a plane positioned approximately tangent to the steering column at that point where the open end of the housing is closest to the steering column. This construction is less expensive than that of the first-mentioned embodiment and is nearly as effective.

The arcuate section 64 is welded directly to the open end of the housing rather than being connected to the housing through a hinged fixture. The embodiment of the invention shown in FIGS. 2 and 3 employs a double hinge and the embodiment of the invention shown in FIG. 4 employs a single hinge. Both embodiments include arcuate sections securable to the housing. Clearly, other hinge or lock placements are possible, depending in part on the shape of the steering column and the configuration of the arcuate sections. Such considerations are well within the capability of one skilled in the art and further discussion is deemed unnecessary.

Although the invention has been described with a certain degree of particularity, it will be appreciated that the present disclosure of the preferred embodiment has been made only by way of example. Various changes in the details of construction may be resorted to without departing from the true spirit and scope of the invention and it is intended to cover all such changes in the appended claims.

What is claimed is:

1. An antitheft device for an automobile comprising:
   (a) a pair of arcuately contoured pipe sections each adapted partially to encircle and engage a steering column;
   (b) a first hinge fixed to the pipe sections and having a pivot axis adapted to parallel the axis of such steering column such that the sections may be brought into a column engaging position in coaxial relationship with the column;
   (c) an ignition switch covering cup connected to one of the sections by a second hinge and including an annular pipe section having an end opening defined by an end wall adapted to engage such steering column with the cup pipe section positioned in ignition lock surrounding relationship;
   (d) the cup including structure closing its end remote from said end wall to prevent ignition lock tampering when the cup is positioned over such lock;
   (e) the second hinge permitting pivoting of the cup about a fixed location second hinge axis to provide ignition lock access without removal of the antitheft device from a steering column when its automobile is in use but adapted to deny ignition lock access when the cup is secured in this theft inhibiting position; and,
   (f) a pair of apertured ears respectively fixed to the cup and the other of the pipe sections, the ears each including a lock receiving aperture with the apertures adapted to be aligned and receive a padlock or the like to fix the cup over an ignition lock when the antitheft device is in use.

* * * * *